(12) United States Patent
McReynolds et al.

(10) Patent No.: US 11,750,479 B1
(45) Date of Patent: Sep. 5, 2023

(54) SYSTEM AND METHOD FOR MANAGING ISSUES BASED ON PAIN REDUCTION EFFICIENCY

(71) Applicant: Dell Products L.P., Round Rock, TX (US)

(72) Inventors: Anne Marie McReynolds, San Jose, CA (US); Ming Qian, Allston, MA (US); Christopher O'Bryon Hill, Bellevue, WA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/863,492

(22) Filed: Jul. 13, 2022

(51) Int. Cl.
| | | |
|---|---|---|
| *H04L 41/5074* | (2022.01) | |
| *G06F 40/30* | (2020.01) | |
| *H04L 41/5067* | (2022.01) | |
| *H04L 41/507* | (2022.01) | |

(52) U.S. Cl.
CPC .......... *H04L 41/5074* (2013.01); *G06F 40/30* (2020.01); *H04L 41/507* (2013.01); *H04L 41/5067* (2013.01)

(58) Field of Classification Search
CPC ............. H04L 41/5074; H04L 41/5067; H04L 41/507; G06F 40/30
See application file for complete search history.

(56) References Cited

U.S. PATENT DOCUMENTS

| | | | |
|---|---|---|---|
| 11,178,025 B1* | 11/2021 | Thornhill | H04L 41/5019 |
| 2020/0065151 A1* | 2/2020 | Ghosh | G06F 40/295 |
| 2020/0136928 A1* | 4/2020 | Sethi | H04L 41/0654 |
| 2021/0004706 A1* | 1/2021 | Riddle | G06Q 10/10 |
| 2021/0014136 A1* | 1/2021 | Rath | G06Q 30/016 |
| 2022/0038350 A1* | 2/2022 | Ranganathan | G06F 40/216 |

* cited by examiner

*Primary Examiner* — Hamza N Algibhah
*Assistant Examiner* — James Ross Hollister
(74) *Attorney, Agent, or Firm* — Womble Bond Dickinson (US) LLP

(57) ABSTRACT

Methods and systems for managing customer encountered issue resolution are disclosed. To manage the customer encountered issue resolution, tickets for the customer encountered issues may be managed to reduce suffering and reduce the rate of ticket churn. To do so, customer pain levels may be identified and used to prioritize resource deployment for ticket resolution. The tickets may be classified into groups for resolution via automated or human-assisted processes, which may be limited in capacity. To ascertain the pain levels of the customers, communications from the customers may be emotionally analyzed to identify emotions present in the customers. The identified emotions may be used to identify whether performed remediation processes for resolving the customer encountered issues were successful, and to what extent they were successful. Information obtained through previous ticket resolutions may be used to prioritize which approach to use to resolve subsequently encountered tickets for customer encountered issues.

20 Claims, 7 Drawing Sheets

SYSTEM AND METHOD FOR MANAGING ISSUES BASED ON PAIN REDUCTION EFFICIENCY

FIELD

Embodiments disclosed herein relate generally to issue management. More particularly, embodiments disclosed herein relate to systems and methods to resource deployment for issue remediation.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
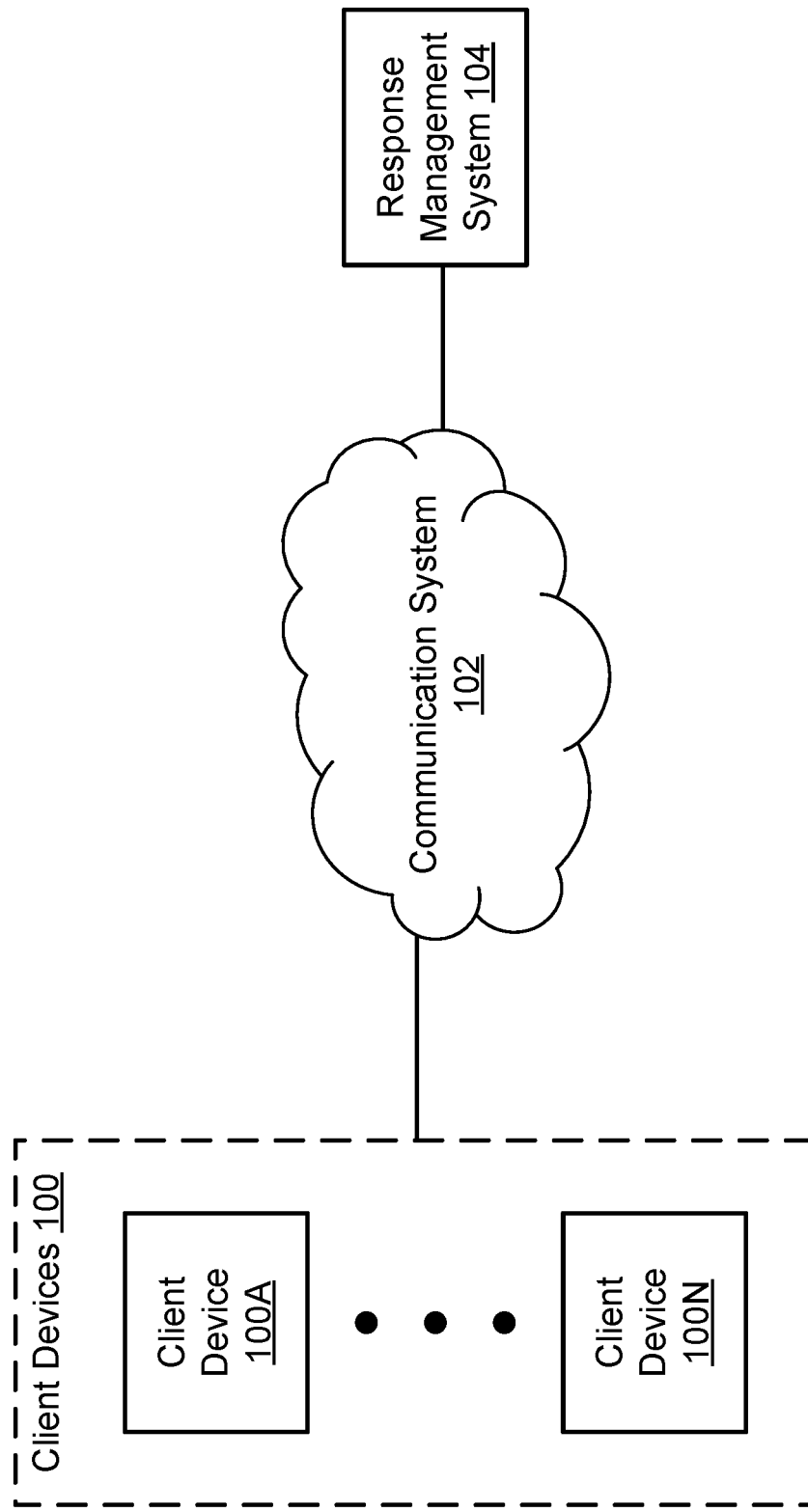
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing customer encountered issue resolution. To manage the customer encountered issue resolution, tickets for the customer encountered issues may be managed to reduce suffering and reduce the rate of ticket churn. To do so, customer pain levels may be identified and used to prioritize resource deployment for ticket resolution. For example, the tickets may be classified into groups for resolution via automated or human-assisted processes, which may be limited in capacity.

To ascertain the pain levels of the customers, communications from the customers may be emotionally analyzed to identify emotions present in the customers. The identified emotions may be used to identify whether performed remediation processes for resolving the customer encountered issues were successful, and to what extent they were successful. Information obtained through previous ticket resolutions may be used to prioritize which approach to use to resolve subsequently encountered tickets for customer encountered issues.

By doing so, a system in accordance with embodiments disclosed herein may prioritize performance of remediation processes that take into account both a level of pain relief likely to be provided as well as the time required for the pain relief to be provided to the consumer. Accordingly, the aggregate quantity of pain by the customer (e.g., pain level multiplied by the time subjected to the pain level) for customer encountered issue resolution may be reduced.

Thus, embodiments disclosed herein may address the technical problem of resource limitations in response management systems. Due to limited availability of resources, only certain numbers and types of remediation processes may be implemented per unit time. By prioritizing selection of remediation processes based on the quantity of aggregate pain likely to be eliminated, embodiments disclosed herein may reduce the suffering of the customers in aggregate when compared to prioritizing resource deployment for customer encountered issued resolution based on other metrics or analysis such as root cause analysis.

In an embodiment, a method for managing remediation of customer encountered issues includes obtaining tickets regarding the customer encountered issues; classifying the tickets into: a first portion that likely require human-assisted remediation for resolution of corresponding customer encountered issues, and a second portion for which corresponding customer encountered issues are likely to be resolved using automated remediation; for the second portion, attempting to resolve the corresponding customer encountered issues using the automated remediation; for the first portion and any tickets of the second portion for which the corresponding customer encountered issued are not resolved by the automated remediation, attempting to resolve the corresponding customer encountered issues using human-assisted remediation driven by a remediation recommendation system; and documenting resolutions of the customer encountered issues based on: changes in pain levels of corresponding customers during each attempted remediation, and timeliness of respective resolutions.

Attempting to resolve the corresponding customer encountered issues using the human-assisted remediation driven by the remediation recommendation system may include, for a first attempt of the attempts to resolve one of the corresponding customer encountered issues using the human-assisted remediation: identifying mitigation actions for the first attempt based on a type of one of the corresponding customer encountered issue; performing the mitigation actions; identifying a pain level of a customer following the performance of the mitigation actions; and identifying one of the changes in the pain levels based on the identified pain level.

The mitigation actions may be identified based on a ranking of potential mitigations provided by the remediation recommendation system. The ranking of potential mitigations provided by the remediation recommendation system may be based on a pain mitigation efficiency score for each of the potential mitigations, each of the potential mitigations comprising a corresponding pain mitigation efficiency score and corresponding mitigation actions. The pain mitigation efficiency score for each of the potential mitigations may be based on a corresponding change of the changes in the pain levels and a time to relief for the corresponding customer encountered issue of the customer encountered issues.

The method may also include obtaining the changes in pain levels of the corresponding customers during each attempted remediation using a pain level scoring system. The pain level scoring system may assign numerical values to detected emotions in the customers and the numerical values depending on a type of the emotions.

Obtaining the changes in the pain levels may include obtaining a first portion of the pain levels prior to each attempted remediation based on first communications; obtaining a second portion of the pain levels after each attempted remediation based on second communications; and calculating the changes in the pain levels using corresponding pairs of the pain levels of the first portion of the pain levels and the second portion of the pain levels. The members of each of the corresponding pairs are from different portions.

Obtaining the first portion of the pain levels may include subjecting the first communications to semantic analysis for emotion recognition. The semantic analysis may include natural language processing of the first communications.

The remediation recommendation system may prioritize potential mitigations that could be performed as part of the human-assisted remediation based on levels of pain relief associated with the potential mitigations (e.g., remediation processes that may include mitigation actions). The levels of pain relief may be based on measured levels of pain relief from previous performances of the potential mitigations with respect to previously remediated customer encountered issues.

A non-transitory media may include instructions that when executed by a processor cause the computer-implemented method to be performed.

A data processing system may include the non-transitory media and a processor, and may perform the computer-implemented method when the computer instructions are executed by the process.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer-implemented services, the system may include any number of client devices 100. Client devices 100 may provide the computer implemented services to users of client devices 100 and/or to other devices (not shown). Different client devices (e.g., 100A, 100N) may provide similar or different computer implemented services.

To provide the computer-implemented services, client devices 100 may include various hardware components (e.g., processors, memory modules, storage devices, etc.) and host various software components (e.g., operating systems, application, startup managers such as basic input-output systems, etc.). These hardware and software components may provide the computer-implemented services via their operation.

To provide certain computer-implemented services, the hardware and/or software components may need to operate in predetermined manners. If the hardware and/or software components do not operate in the predetermined manners, then a client device may be unable to provide all, or a portion, of the computer-implemented services that it normally provides.

The hardware and/or software components of client devices 100 may operate differently (e.g., in an undesirable manner) from the predetermined manners for any number of reasons. For example, any of the hardware and/or software components may malfunctioning. In another example, the hardware and/or software components may be operating nominally but in undesirable manners through various interactions such as resource conflicts or constraints. In a further example, various configuration settings of the hardware and/or software components may be set (intentionally or inadvertently) in a manner that causes the operation of the client device to be undesirable. The hardware and/or software components of client devices 100 may operate different from the predetermined manners for other reasons (e.g., various root causes) without departing from embodiments disclosed herein. Thus, a client device may not provide its computer-implemented services for any number of reasons which may be difficult to identify.

The undesired operation of client devices 100 may take any number of forms which may be linked to a root cause of the undesired operation. For example, an undesired operation of a client device may be a lack of operation such as failing to power on when a power button is depressed. In another example, an undesired operation of a client may be a failure of the client device to utilize a full width of a display when presenting information to a user via the display. In a further example, an undesired operation of a client device may be inconsistent operation of the client device over time such as the client device intermittently freezing. The undesired operation of client devices 100 may manifest in other manners without departing from embodiments disclosed herein. Thus, a client device may manifest any number of undesired operation which may be due to any number of root causes.

To improve the likelihood of client devices 100 providing desired computer implemented services, the system of FIG. 1 may include response management system (RMS) 104. RMS 104 may be tasked with addressing undesired operation of any of client devices 100. However, RMS 104 may have limited resources with which to address the undesired operation of client device 100.

In general, embodiments disclosed herein may provide methods, systems, and/or devices for managing undesired operation of client device 100. To manage the undesired operation of client device 100, RMS 104 may provide remediation services to address the undesired operation of client device 100. The remediation services may take into account changes in pain levels of users of client device 100 when deciding how to attempt to remediate undesired operation of any of client devices 100. By taking into account pain levels of users of client device 100, RMS 104 may marshal its limited resources in a manner that reduces the pain of the users of client devices 100 efficiently.

To provide the remediation services, RMS 104 may (i) receive information from user of client devices 100 regarding various customer encountered issues (e.g., undesired operation of client devices 100 encountered by users thereof) with respect to client devices 100, (ii) establish tickets based on the customer encountered issues, (iii) classify the tickets based on previously remediated customer encountered issues and identified changes in pain levels during the previous remediation of the customer encountered issues, (iv) initiate automated and/or human-assisted remediation of the customer encountered issues indicated by the classified tickets, (v) monitor pain levels of the users during and/or the initiated mediation of the customer encountered issues, (vi) for customer encountered issues that are successfully remediated using known remediation procedures, document the success and corresponding monitored pain levels, changes in pain levels, and/or other key performance indicators, (vii) for unsuccessful remediation of customer encountered issues, escalate remediation of the customer encountered issues until successfully remediated, and (viii) document the success and corresponding monitored pain levels, changes in pain levels, and/or other key performance indicators for the escalated remediation of the customer encountered issues, and (ix) refine the remediation procedures using the documented successes and key performance indicators. By doing so, the system of FIG. 1 may reduce a time to remediation of pain of the users of client devices 100.

Figure 2A:
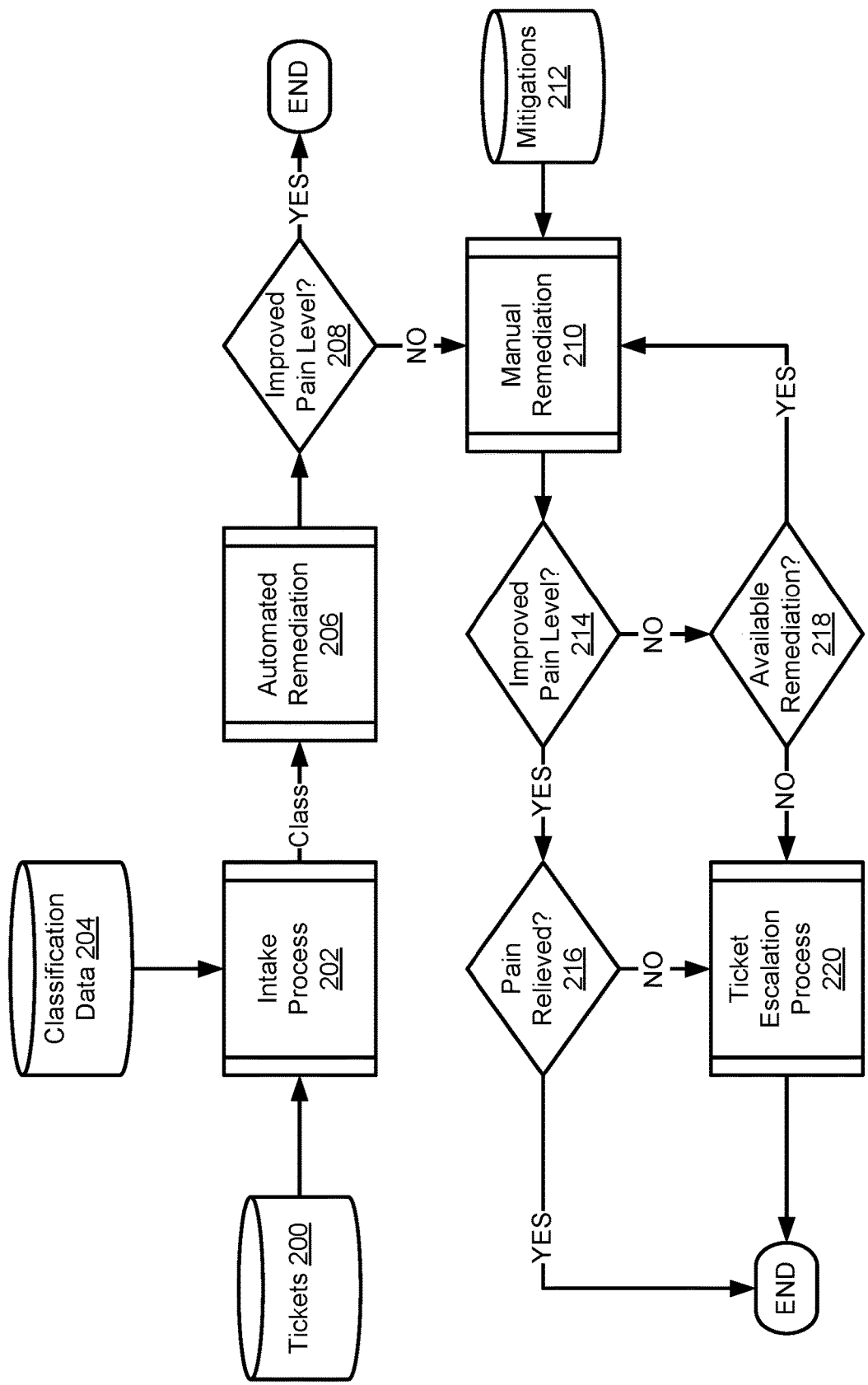
FIG. 2A shows a diagram illustrated data flows, processes, and other aspects of a system in accordance with an embodiment.
Figure 2B:
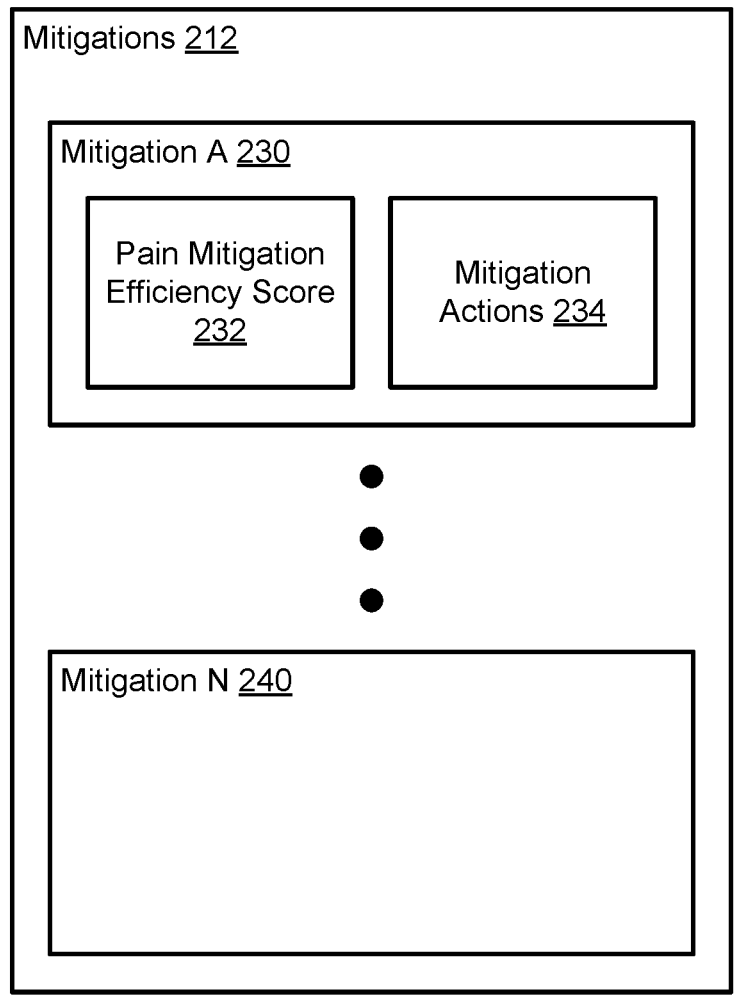
FIG. 2B shows a diagram illustrating a data structure usable by a system in accordance with an embodiment.
Figure 2C:
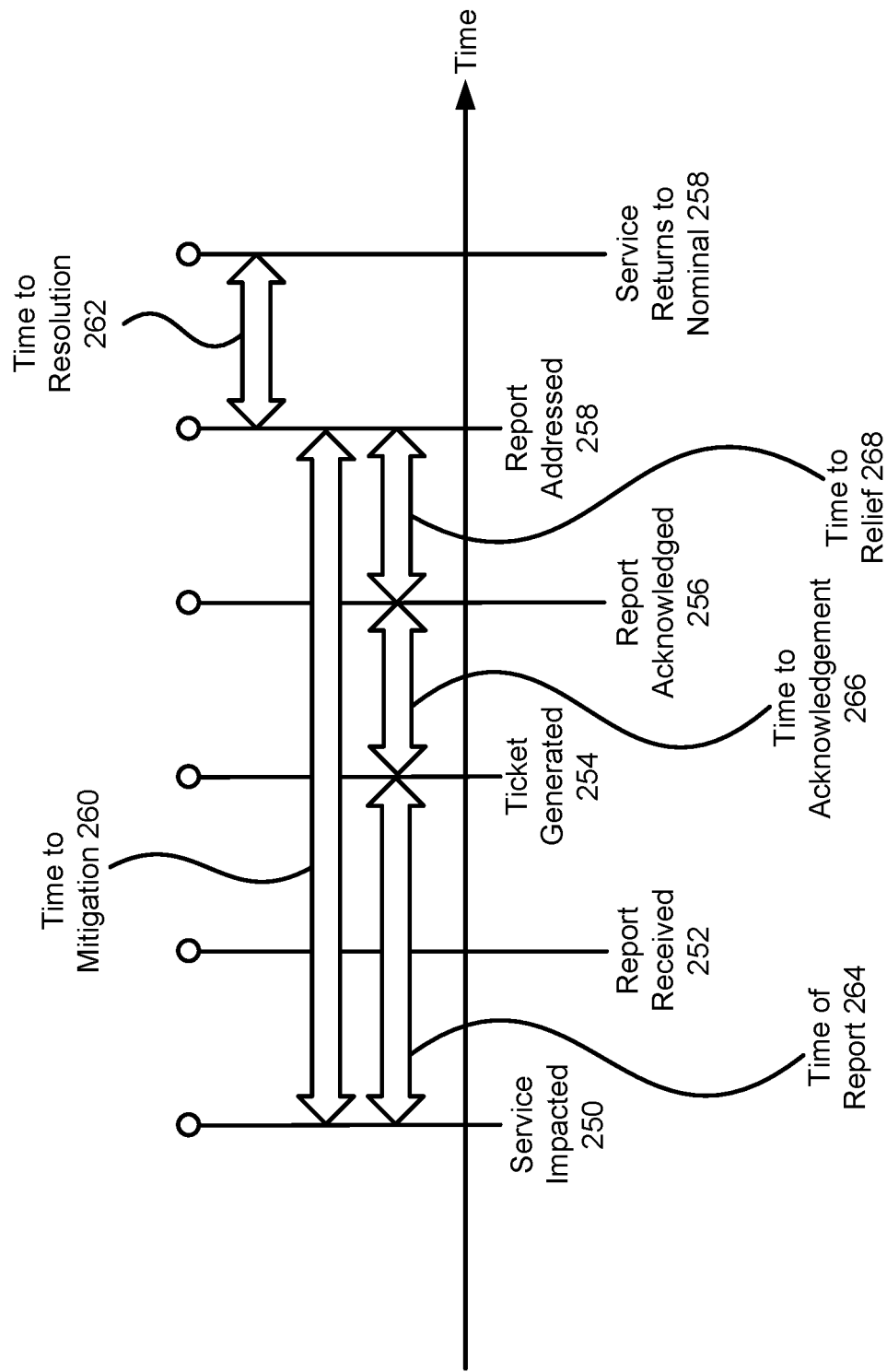
FIG. 2C shows a diagram illustrating a time line used by a system in accordance with an embodiment.
Figure 3A:
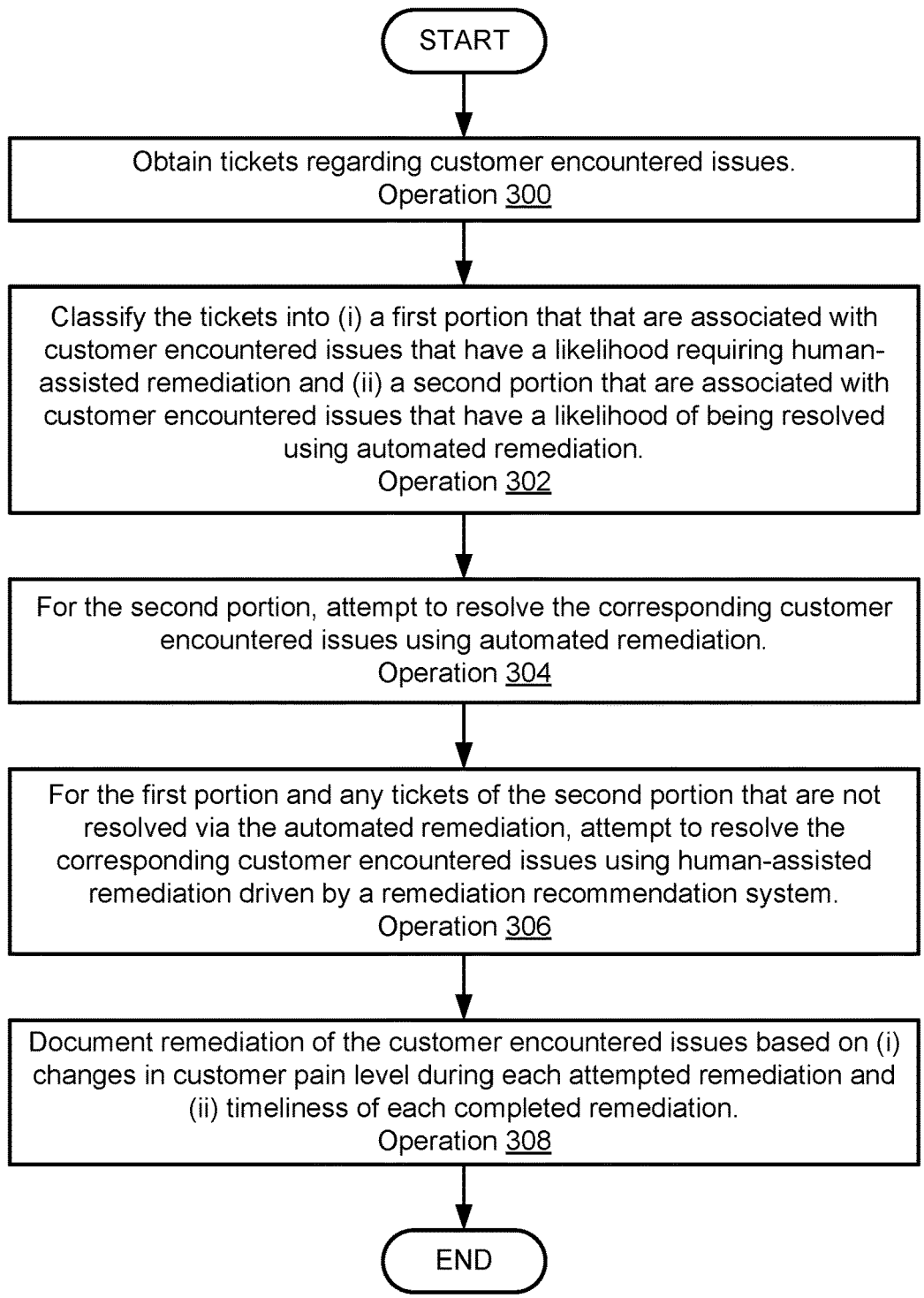
FIG. 3A shows a flow diagram illustrating a method of remediating a customer encountered issue in accordance with an embodiment.
Figure 3B:
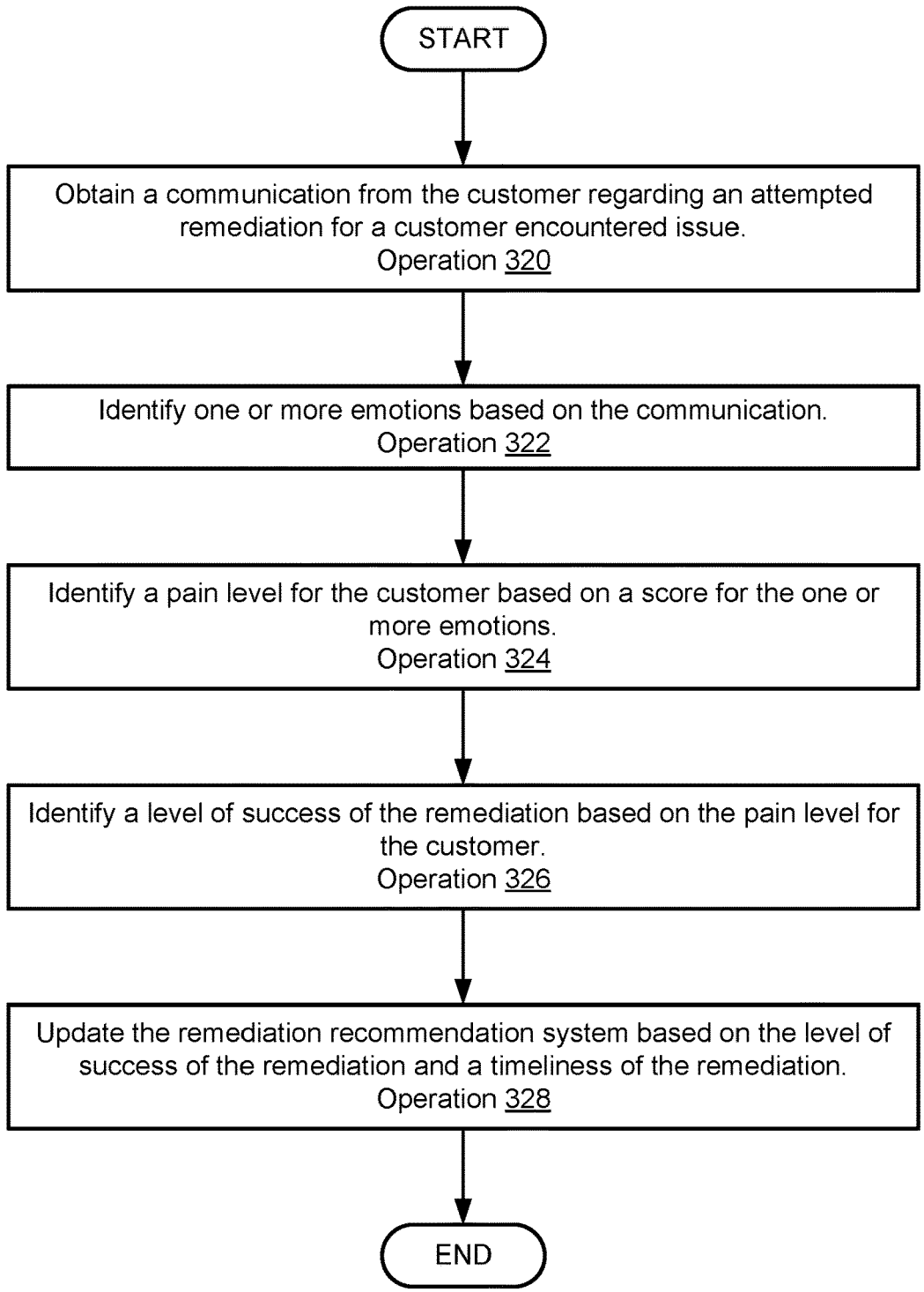
FIG. 3B shows a flow diagram illustrating a method of updating operation of a remediation recommendation system in accordance with an embodiment.

When providing its functionality, response management system 104 may perform all, or a portion, of the methods illustrated in FIGS. 3A-3B. Refer to FIGS. 2A-2C for additional details regarding response management system 104.

Any of client devices 100 and/or RMS 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

RMS 104 may be implemented with multiple computing devices. The computing devices of RMS 104 may cooperatively perform processes for managing customer encountered issues. The computing devices of RMS 104 may perform similar and/or different functions, and may be used by different persons that may participate in the management of the customer encountered issues. RMS 104 may be maintained, for example, by a business or other entity that has some degree of responsibility with respect to maintaining the operation of client devices 100. For example, RMS 104 may be operated by a business that sells client devices 100 and provides warranty or other types of support for client devices 100 to users and/or owners thereof.

Any of the components illustrated in FIG. 1 may be operably connected to each other (and/or components not illustrated) with a communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

To further clarify embodiments disclosed herein, diagrams illustrating data flows implemented by and data structures used by a system over time in accordance with an embodiment are shown in FIG. 2A and FIGS. 2B-2C, respectively.

Turning to FIG. 2A, a data flow diagram illustrating data flows, data processing, and/or other operations that may be performed by RMS 104 in accordance with an embodiment is shown.

To manage customer encountered issues, RMS 104 may obtain tickets 200. Tickets 200 may be data structures that include information regarding the customer encountered issues. Tickets 200 may be obtained by (i) obtaining information regarding the customer encountered issues and (ii) adding the obtained information to a new or existing ticket. The information may be obtained, for example, by (i) receiving the information via a portal (e.g., a website), (ii) receiving the information via phone calls, video calls, instant messages, and/or via other types of interactions with users (which may be subsequently subjected to processing to derive recordable information regarding the user and the customer encounter issue), and/or (iv) via other methods. Once the ticket is created, the customer encountered issue associated with a ticket may be acknowledged to the user or entity that provided information leading to creation of the ticket. During this process, information regarding, for example, when the customer encountered issued was initial reported (referred to as the time point report received 252 in FIG. 2C), when the ticket was created (referred to as the time point ticket generated 255 in FIG. 2C), and/or when the customer encountered issue was acknowledged (referred to as the time point report acknowledged 266 in FIG. 2C) may by be recorded.

Once obtained, tickets 200 may be subjected to intake process 202 which classifies the tickets as either likely to be resolved using automated remediation processes or likely to require human-assisted remediation for resolution. A ticket may be resolved when the corresponding customer encountered issues has been addressed through various remediation attempts.

To classify the tickets, classification data 204 may be utilized. Classification data 204 may include, for example, inference models usable to classify the tickets. The inference models may be trained using the outcomes of previously resolved tickets. The inference model may take, as input, information included in a ticket and provide, as output, a prediction regarding whether the ticket will be resolved through automated remediation. While described with respect to trained inference models, such as neural networks or other trained machine learning models, classification data 204 may include other types of information usable to obtain inferences regarding whether the ticket will be resolved through automated remediation without departing from embodiments disclosed herein.

Once classified, the tickets that are classified as likely to be resolved using automation may be subjected to automated remediation 206. Automated remediation 206 may include performing various computer automated processes for attempting to remediate a customer encountered issue. The computer automated processes may be selected based on previously performed remediation of customer encountered issues and corresponding level of pain reduction (and/or scores for potential remediation processes derived from the levels of pain reduction). For example, a database of potential computer automated remediation processes may be maintained. The database may include keys or other features usable to identify potential computer automated remediation processes that may be relevant to a customer encountered issue indicated by a ticket. The database may also provide a relative or absolute ranking of the potential computer automated remediation processes. The ranking may be based on the corresponding level of pain reduction. The rankings may be used to sequentially select and attempt the potential computer automated remediation process that has a highest associated level of pain reduction. Previously attempted potential computer automated remediation processes may be ignored when selecting subsequent potential computer automated remediation processes.

If a ticket is remediated using the automated remediation processes, information regarding the process may be used to update the rankings of the potential compute automated remediation processes so that subsequent attempts to resolve tickets take into account the information learned (e.g., a likelihood of success and pain reduction) through each computer automated remediation process. To do so, the level of pain of the user before and after each attempted computer automated remediation process may be measured. The level of pain may be used to identify levels of pain reduction (or increase) of the user for each attempted computer automated remediation process.

To ascertain whether a ticket has been resolved, the pain level of the user may be subject to processing to determine whether an improved pain level 208 has been achieved. For example, if an automated remediation attempt resulted in a reduction of the pain level of the user, then the ticket may be treated as being resolved (and/or may be treated as being resolved based on other indicators such as the user indicating that the corresponding customer encountered issue has been eliminated or reduced to an acceptable level). If the improved pain level indicates that the ticket has been resolved, then RMS 104 may end processing for that ticket (e.g., the YES path following the decision point 208).

For tickets that are not resolved by automated remediation 206 and tickets classified as likely requiring human-assisted remediation for resolution, these remaining tickets may be subjected to manual remediation 210. During manual remediation 210, human-assisted remediation of the tickets may be performed. For example, a ticket may be assigned to a support engineer or other person. The support engineer may be tasked with remediating the ticket. To remediate the ticket, the support engineer may assist in the implementation of remediation processes from mitigations 212. Mitigations 212 may be implemented with a data structure that provides remediation processes for attempts to resolve tickets. Mitigations 212 may rank order the potential remediation processes based on pain mitigation efficiency score (PMES). The PMES may take into account both a quantity of time to complete a potential remediation process as well as the likely reduction in pain level provided by the potential remediation process. PMES for potential remediation processes may be based on previously performed remediation processes.

To calculate the PMES for a previously performed remediation process, a numeral value may be calculated by (i) identifying a level of pain reduction provided by the potential remediation, (ii) identifying a duration of time (also referred to as a time to relief 268 as shown in FIG. 2C) between when the customer encountered issue was acknowledged by RMS 104 and when the customer countered issue was resolved by the previously performed remediation process, and (iii) dividing the level of pain reduction by the duration of time. As remediation processes are performed, the PMES as well as information regarding the previously performed remediation processes may be stored with mitigations 212. By doing so, a repository or other data structure may be included in mitigations 212 that allows lookup to be performed to identify a next potential remediation process to attempt.

The potential remediation processes may be ranked, as noted above, based on the corresponding PMES of each potential remediation process. Consequently, for a given ticket, a range of different remediation procedures with corresponding PMES may be identified, and may sequentially implemented (from highest to lowest PMES, with highest being best) as part of manual remediation 210 until the ticket is resolved or no more potential remediation processes available to perform. If the pain of the user does not improve and all of the potential remediation processes are exhausted (e.g., 218), then the ticket may be escalated as discussed in greater detail below.

To ascertain whether a ticket has been resolved by an attempted remediation process, RMS 104 may identify whether an improved pain level 214 of the user has been achieved, similar to the check performed after each computer automated remediation process performed during automated remediation 206. If the pain level has improved (by at least a threshold level, which may depend on a type of customer encountered issue and/or other factors), then a check regarding whether the pain of the user has been relieved (e.g., 216). The check may be performed by comparing the pain level of the user to a static threshold (e.g., a sufficiently low score, which may depend on the customer encountered issue and/or other factors).

As noted above, if the pain of the user is not relieved and all of the applicable potential remediation processes of mitigations 212 are exhausted, ticket escalation process 220 for the ticket may be performed. As part of the process, a higher level support person or team may be assigned to resolve the ticket.

As part of resolving the tickets either through manual remediation 210 or ticket escalation process 220, information regarding the performed processes may be used to update the potential remediation processes performed via automated remediation 206 and manual remediation 210 for subsequently processed tickets. For example, new potential remediation processes may be added to mitigations 212 and/or existing remediation processes may be revised. The additions/revisions may add or revise PMES thereby potentially changing the order in which potential remediation processes are performed. Refer to FIG. 2B for additional details regarding mitigations 212.

To calculate the PMES values for tickets resolved by ticket escalation process 220, the pain reduction level of pain reduction may be divided by a duration of time between when a service outage leading to a corresponding customer encountered issue begins and when the ticket is resolved, rather than the time to relief. By doing so, new potential remediation processes added based on ticket escalation process 220 may initially be lower ranked by the PMES so that new potential remediation processes (and/or revised remediation processes) may be deprioritized when compared to other remediation processes that may be more thoroughly used.

To do so, RMS 104 may record information regarding the performance of these processes, in additional to the time information regarding tickets 200, intake process 202, automated remediation 206, and/or other processes to establish a holistic timeline of previously performed remediation processes. Refer to FIG. 2C for additional details regarding the aforementioned information.

By doing so, RMS 104 may prioritize performance of various potential remediation processes based on a combination of pain level reduction that is expected to be achieved, a time expected for the pain level reduction to be achieved, and/or other information. Thus, RMS 104 may balance both the speed at which pain of the users may be reduced and the magnitude of the expectation pain level reduction.

As part of the aforementioned process, the pain level of users for which the tickets are being processed may be identified. The pain level of the users may be identified by (i) obtaining communications from the users which may include text, audio, and/or forms of communications, (ii) analyzing the communications to identify emotions of the users, and (iii) calculating an aggregate score based on the identified emotions of the users using a scoring system. The scoring system may specify point values for different emotions. Generally, emotions associated with higher energy of the user may be associated with higher point values while emotions associated with lower energy of the user may be associated with lower point values. For example, the scoring system may specify a point value between 10-20 for anger, a point value between 5-15 for frustration, a point value between 3-13 for disgust, a point value of 0-10 for fear, and a point value of 0-8 for fatigue. In an embodiment, the scoring system specifies a point value of 15 for anger, 10 for frustration, 8 for disgust, 5 for fear, and 3 for fatigue. The point values for each emotion may be different from those specified herein without departing from embodiments disclosed herein.

To calculate the aggregate score for the user with respect to a previously performed remediation process, the point value for each emotion of the user that is identified may be summed. For example, if anger, frustration, and fear is detected in a user, the aggregate score for the user may be 20.

To identify emotions that are present in the users, the communications may be subject to any type and quantity of processing including, for example, natural language processing, semantic detection, dictionary lookup processes, and/or other types of processes which may be implemented using any type of relationship system(s) such as inference models implemented using machine learning model (or other trainable systems) or other type of inference generation systems.

During any portion of the processes illustrated in FIG. 2A, tickets and subsequently performed processes may be replicated for parallel processing. For example, when a ticket is subjected to manual remediation 210, information regarding the processes performed therein may be replicated to multiple databases for redundancy purposes.

Likewise, as the processes are performed, information regarding these processes may be collected and used to document the previously performed processes. The information collected may include, for example, logs of the processes, copies of the tickets, alerts, events, communications between the users and RMS 104, pain levels of the users, etc. The information may be used to refine the approach taken to remediation subsequently processed tickets.

To select potential remediation processes as part of automated remediation 206 and/or manual remediation 210, various recommendations systems may be utilized. The recommendations systems may include inference models that may operate on the tickets and/or information collected regarding the remediation processes being/previously performed and provide suggestions regarding next remediation processes to perform to remediate the tickets. At any point, a support engineer or other person may, as part of manual remediation 210, override or select a different remediation process to attempt to resolve a ticket. For example, the support engineer or other person may review remediation processes suggested by the remediation system and may elect to implement the proposed or another remediation process.

In an embodiment, RMS 104 is implemented using a hardware device including circuitry. The hardware device may be, for example, a digital signal processor, a field programmable gate array, or an application specific integrated circuit. The circuitry may be adapted to cause the hardware device to perform the functionality of RMS 104 such as intake process 202, automated remediation 206, manual remediation 210, and/or ticket escalation process 220. RMS 104 may be implemented using other types of hardware devices without departing embodiment disclosed herein.

In one embodiment, RMS 104 is implemented using a processor adapted to execute computing code stored on a persistent storage that when executed by the processor performs the functionality of RMS 104 discussed throughout this application such as intake process 202, automated remediation 206, manual remediation 210, and/or ticket escalation process 220. The processor may be a hardware processor including circuitry such as, for example, a central processing unit, a processing core, or a microcontroller. The processor may be other types of hardware devices for processing information without departing embodiment disclosed herein.

In an embodiment, RMS 104 includes storage which may be implemented using physical devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage may include a memory device (e.g., a dual in line memory device) in which data is stored and from which copies of previously stored data are provided. In another example, storage may include a persistent storage device (e.g., a solid-state disk drive) in which data is stored and from which copies of previously stored data is provided. In a still further example, storage may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage may store data structures including tickets 200, classification data 204, mitigations 212, and/or other types of information. Any of these data structures may be implemented using, for example, lists, tables databases, linked lists, unstructured data, and/or other types of data structures.

While RMS 104 is illustrated in FIG. 2A as including a select number of components and as storing specific types of information, RMS 104 may include different components and may store other types of data.

Turning to FIG. 2B, a diagram of mitigations 212 in accordance with an embodiment is shown. As discussed above, mitigations 212 may include information usable to select mitigations processes that may be likely to reduce a level of a user's pain in a timely manner. To do so, mitigations 212 may include any number of mitigations (230-240). Each of the mitigations may be associated with different customer encountered issue types and may include (i) a PEMS 232 and (ii) mitigation actions 234. The PEMS 232 of each mitigation may be usable to rank the mitigations associated with a particular customer encountered issue.

Mitigation actions 234 may include any number and type of actions to be performed to remediate a customer encountered issue. The remediation actions may include, for example, restarting of devices, installation/removal of applications, changing configuration settings, and/or any other type of action that may remediate a customer encountered issue.

Turning to FIG. 2C, a diagram of a timeline of a remediation process in accordance with an embodiment is shown. In the figure, time may increase from left to right across the page. Various points in time are indicated using vertical lines terminating in circles.

As seen in FIG. 2C, a timeline of a remediation process may include several time points include service impacted 250 (e.g., when a service leading to customer encountered issues becomes impacted, a root cause), report received 252 (e.g., when a user reports that they have encountered an issue), ticket generated 254 (e.g., when RMS 104 generates a ticket based on the report), report acknowledged 256 (e.g., when RMS 104 acknowledges that customer encountered issues to the user or other entity), report addressed (e.g., when the generated ticket is resolved), and service returns to nominal 258 (e.g., when the impacted service returns to nominal operation). While the time points are illustrated in FIG. 2C being approximately equidistant from each other, it should be appreciated that the duration of time between any of these time points may be different from other durations of time between other time points.

As discussed above, calculate a PMES for a previously performed remediation process, various periods of time may be tracked. These periods of time may include time to mitigation 260, time to resolution 262, time of report 264, time to acknowledgement 266, and time to relief 268. RMS 104 may calculate (dynamically or ahead of time) the duration of these periods of time based on the documents points in time.

By quantifying and using the quantification of these periods of time when prioritizing different mitigation processes, embodiments disclosed herein may balance the value of timeliness of remediation and pain reduction of the users.

As discussed above, the components of FIG. 1 may perform various methods to manage customer encountered issues. FIGS. 3A-3B illustrate methods that may be performed by the components of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of remediating customer encountered issues in accordance with an embodiment is shown. The method may be performed by RMS 104 or other components of the system shown in FIG. 1.

At operation 300, tickets regarding customer encountered issues are obtained. The tickets may be obtained by reading them from storage, receiving them from other devices, and/or by generating them. To generate the tickets, information regarding the customer encountered issue may be collected (e.g., via a portal and/or other communication medium). The information may be used to generate the ticket via, for example, population of a data structure with the information. The information may include any type and quantity of information regarding the customer encountered issue. The customer encountered issue may relate, for example, to a computing device for which RMS 104 provides issue management services.

At operation 302, the tickets are classified into two portions. A first portion of the two portions may include tickets that are associated with customer encountered issues that have a likelihood requiring human-assisted remediation. A second portion of the two portions may include tickets that are associated with customer encountered issues that have a likelihood of being resolved using automated remediation. The tickets may be classified based on information regarding previous remediation processes. For example, a recommendation system may use the information as training data so that the recommendation system may accurate identify which ticket should be classified into the respective portions.

At operation 304, for the second portion, the corresponding customer encountered issues may be attempted to be resolved using automated remediation. Each attempted remediation may be performed by (i) selecting a remediation process and (ii) performing the remediation process. The remediation process may be selected by the recommendation system. Generally, the remediation process may select the remediation process on the basis of pain level reduction for a user that provided the information used to generate the ticket and/or timelines of the pain level reduction. The remediation process may include, for example, initiating performance of a runbook automation or other automated process for performing a set of actions that may remediate the customer encountered issue.

The automated remediation may include performing multiple remediation processes (e.g., until all or a threshold number of computer-implemented remediation process for the customer encountered issue have been exhausted).

At operation 306, for the first portion of the tickets and any of the tickets of the second portion that are not resolved by the automated remediation, the corresponding customer encountered issues are attempted to be resolved using human-assisted remediation driven by a remediation recommendation system. The remediation recommendation system may include mitigations 212 and an inference model that may indicate an order of preference with respect to potential human-assisted remediation processes that may be applicable to the customer countered issues. The corresponding customer encountered issues may be attempted to be resolved by performing some of the human-assisted remediation processes. For example, a support engineer or other person may review the order of preference and sequentially select human-assisted remediation processes to be performed. The selected human-assisted remediation processes may be performed to attempt to resolve the tickets associated with corresponding customer encountered issues.

At operation 308, remediation of the customer encountered issues is documented based on changes in customer pain level during each attempted remediation and timeliness of each completed remediation. For example, a PMES for each attempted remediation may be calculated. As noted above, the PMES may be calculated based on a scoring system that considers the emotional impact on user that may have provided the information regarding the customer encountered issues and may be suffering due to the customer encountered issues.

Information regarding each attempted remediation, the PMES, and/or other information (e.g., logs, alerts, messages, etc.) associated with the attempted remediation processes may be stored and used to update operation of the remediation recommendation system. By doing so, the recommendation system may be continuously improved to better order potential remediation processes for subsequently identified customer encountered issues.

The method may end following operation 308.

Using the method illustrate din FIG. 3A, embodiments disclosed herein may reduce customer pain suffered for customer encountered issue management.

For example, consider a scenario in which a person utilizes a help line to report a customer encountered issued regarding a computing device, such as an error in the operation in a display.

When the person makes the call, the person's communication may be analyzed to identify an initial pain level for the person. If the person's communication indicates that the person if feeling anger, disgust, and fatigue, an aggregate initial pain level of 28 may be assigned to the person.

After a ticket is generated for the display error, the classification may classify the ticket as being potentially resolvable using automated remediation. However, the automated remediation may fail. Following the failure of the automated remediation, no other automated remediation processes may be available and the ticket may be directed to human-assisted remediation for resolution. A support engineer may review the rankings for potential remediation processes and may select the highest rated remediation process which may include restarting the monitor. Following the restart, the user may report to the support engineer via a communication that the restart did not resolve the display error, and emotion analysis of the communication may indicate that now frustration, in addition to anger, disgust, and fatigue is present in the user. Consequently, the pain level of the user is revised to 36 (an increase of 8) based on the newly presented frustration of the user.

The support engineer may subsequently perform a second remediation process which may successfully address the display error. Consequently, the user reports to the support engineer via a second communication that the display error is resolved. Emotion analysis of the second communication may indicate that now only frustration and fatigue are present in the user resulting in the pain level of the user being revised to 13.

To ascertain whether the user's pain has been sufficiently reduced, the change in pain level from the baseline of 30 is calculated and, is this example, is 15. In this example, a reduction of 15 and currently pain level of 13 meets the corresponding thresholds for the ticket to be resolved.

Following the ticket resolution, information regarding the resolution may be documented including the PMES by dividing the difference of 15 by the time to relief which, for purpose of example, may be 30 minutes. Accordingly, a PMES of 50% may be calculated for the remediation process performed to resolve the ticket. This information (and/or other performance indicates such as any of the time points discussed with respect to FIG. 2C, pain levels, and/or changes in pains levels) and information regarding the performed remediation processes may be used to refine (e.g., update) the prioritization of potential remediation processes for future customer encountered issues.

Turning to FIG. 3B, a flow diagram illustrating a method of updating a remediation recommendation system in accordance with an embodiment is shown. The method may be performed by RMS 104 or other components of the system shown in FIG. 1.

At operation 320, a communication from a customer (e.g., a user that submitted information regarding a customer encountered issued leading to generation of a ticket) regarding an attempted remediation for a customer encountered issue is obtained. The communication may be obtained by, for example, receiving it via the a portal, via a telephone or voice over internet protocol call, or via another communication medium. For example, the communication may be received as part of a support session for the customer and during which various remediation processes (automated, human assisted, etc.) are performed to attempt to resolve a corresponding ticket.

At operation 322, one or more emotions are identified based on the communication. The emotions may be identified by analyzing the communication via automated processing. For example, natural language processing and/or other analysis methods may be used to parse and/or interpret the communication with respect to indicators of emotion. The indicators of emotion may identify the one or more emotions. The one or more emotions may be identified via other methods without departing from embodiments disclosed herein.

At operation 324, a pain level for the customer is identified based on a score for the one or more emotions. The pain level may be identified by summing values for each emotion obtained using a scoring system that ascribes point values for each emotion that may be identified in operation 322. As noted above, the scoring system may ascribe different point value to different motions on a basis of energy level associated with each of the emotions.

At operation 326, a level of success of the remediation is identified based on the pain level for the customer. The level of success may be identified by calculating a PMES using the identified pain level, a previous pain level of the customer, and a time that it took to relief the pain.

At operation 328, the remediation recommendation system is updated based on the level of success of the remediation and the timeliness of the remediation. The remediation recommendation system may be updated by adding (i) the PMES, (ii) information regarding performed remediation processes, (iii) log information, and/or (iv) other types of information regarding the performed remediation processes to various data structures. The added information may cause the recommendation system to make recommendations that reflect the new information obtained via a resolution of a ticket.

The method may end following operation 328.

Thus, using the methods illustrated in FIGS. 3A-3B, embodiments disclosed herein may balance pain relief and timeliness is pain relief when selecting remediation processes for ticket resolution.

The methods and systems disclosed herein may be broadly applicable to wide range of scenarios including, for example, (i) automated identification of tickets that require assisted service during make-or-break touchpoints in customer support journey—using a supervised classification algorithm to categorize new tickets based on sentiment analysis, (ii) implementing phone-based mitigations using speech analysis because phrases such as "show me" or "need to see/visualize" suggest resolving complex situations through human interaction and diagnosis rather than automated processes, (iii) to understand intent and manage inquiries, searching for keywords or phrases that indicate failed self-service options or customer preference can surface insights that might get missed in the Customer Relation Management (CRM) application because of human error and/or analyzing calls for customer sentiment ("I'm really not happy about this") and surfacing negative responses ("Nothing I can do") could be a recurring exercise to understand what is going wrong and where the customer experience could be improved.

Figure 4:
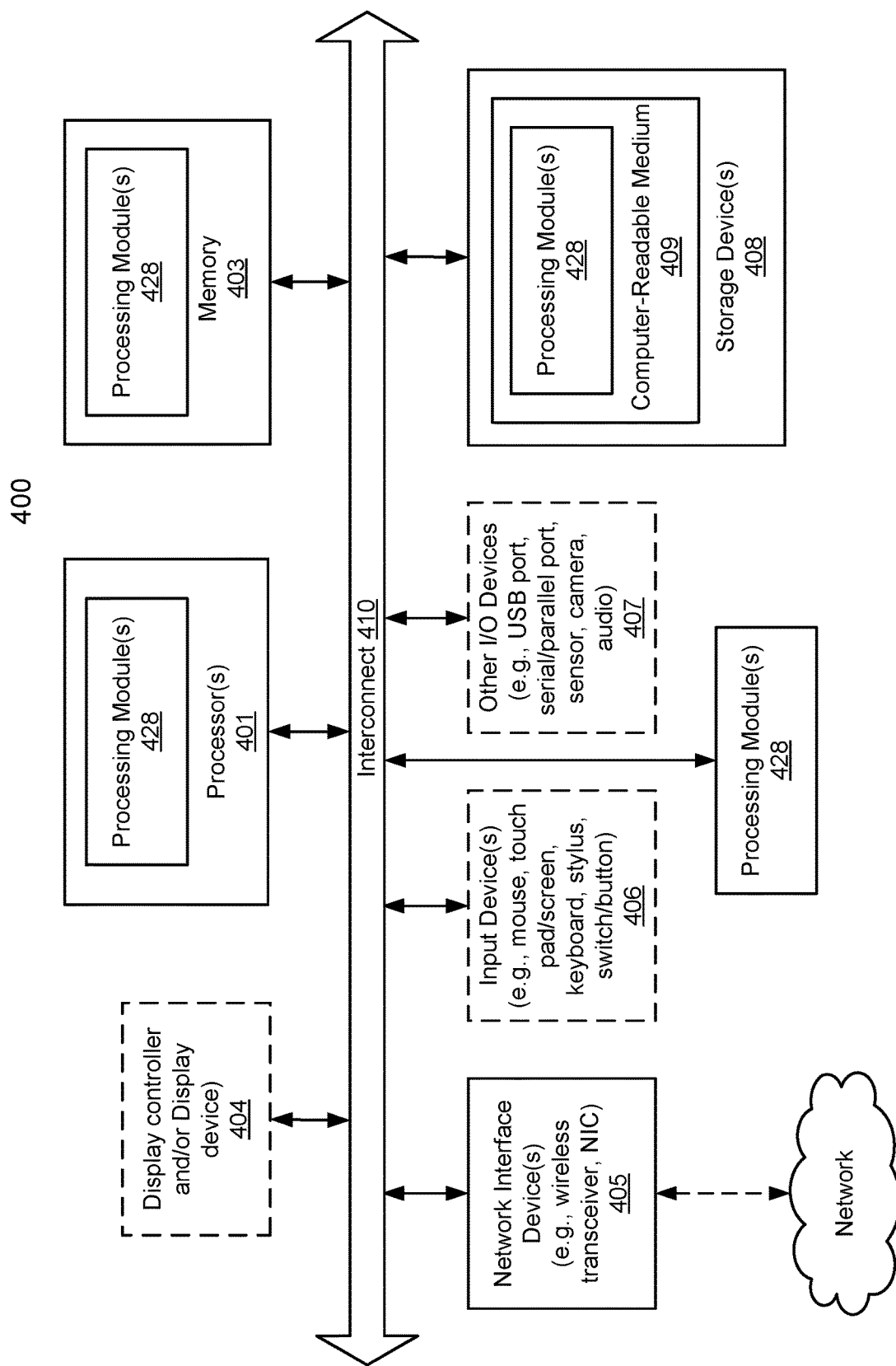
FIG. 4 shows a block diagram illustrating a data processing system in accordance with an embodiment.

Any of the components illustrated in FIGS. 1-2A may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing remediation of customer encountered issues, the method comprising:
   obtaining tickets regarding the customer encountered issues;
   classifying the tickets into:
      a first portion that likely require human-assisted remediation for resolution of corresponding customer encountered issues, and
      a second portion for which corresponding customer encountered issues are likely to be resolved using automated remediation;
   for the second portion, attempting to resolve the corresponding customer encountered issues using the automated remediation;
   for the first portion and any tickets of the second portion for which the corresponding customer encountered issued are not resolved by the automated remediation, attempting to resolve the corresponding customer encountered issues using human-assisted remediation driven by a remediation recommendation system; and
   documenting resolutions of the customer encountered issues based on:
      changes in pain levels of corresponding customers during each attempted remediation, and
      timeliness of respective resolutions.

2. The method of claim 1, wherein attempting to resolve the corresponding customer encountered issues using the human-assisted remediation driven by the remediation recommendation system comprises:
   for a first attempt of the attempts to resolve one of the corresponding customer encountered issues using the human-assisted remediation:
      identifying mitigation actions for the first attempt based on a type of one of the corresponding customer encountered issue;
      performing the mitigation actions;
      identifying a pain level of a customer following the performance of the mitigation actions; and
      identifying one of the changes in the pain levels based on the identified pain level.

3. The method of claim 2, wherein the mitigation actions are identified based on a ranking of potential mitigations provided by the remediation recommendation system.

4. The method of claim 3, wherein the ranking of potential mitigations provided by the remediation recommendation system is based on a pain mitigation efficiency score for each of the potential mitigations, each of the potential mitigations comprising a corresponding pain mitigation efficiency score and corresponding mitigation actions.

5. The method of claim 4, wherein the pain mitigation efficiency score for each of the potential mitigations is based on a corresponding change of the changes in the pain levels and a time to relief for the corresponding customer encountered issue of the customer encountered issues.

6. The method of claim 1, further comprising:
   obtaining the changes in pain levels of the corresponding customers during each attempted remediation using a pain level scoring system.

7. The method of claim 6, wherein the pain level scoring system assigns a predetermined numerical value to each detected emotion among detected emotions in the customer's communication and generates an aggregate pain level score reflecting a summary of all of the detected emotions using the assigned ones of the predetermined numerical value.

8. The method of claim 6, wherein obtaining the changes in the pain levels comprises:
   obtaining a first portion of the pain levels prior to each attempted remediation based on first communications;
   obtaining a second portion of the pain levels after each attempted remediation based on second communications; and
   calculating the changes in the pain levels using corresponding pairs of the pain levels of the first portion of the pain levels and the second portion of the pain levels, wherein members of each of the corresponding pairs are from different portions.

9. The method of claim 8, wherein obtaining the first portion of the pain levels comprises subjecting the first communications to semantic analysis for emotion recognition.

10. The method of claim 9, wherein the semantic analysis comprises natural language processing of the first communications.

11. The method of claim 1, wherein the remediation recommendation system prioritizes potential mitigations that could be performed as part of the human-assisted remediation based on levels of pain relief associated with the potential mitigations.

12. The method of claim 11, wherein the levels of pain relief are based on measured levels of pain relief from previously remediated customer encountered issues during which the potential mitigations were previously performed.

13. A non-transitory machine-readable medium having instructions stored therein, which when executed by a processor, cause the processor to perform operations for managing remediation of customer encountered issues, the operations comprising:
   obtaining tickets regarding the customer encountered issues;
   classifying the tickets into:
      a first portion that likely require human-assisted remediation for resolution of corresponding customer encountered issues, and
      a second portion for which corresponding customer encountered issues are likely to be resolved using automated remediation;
   for the second portion, attempting to resolve the corresponding customer encountered issues using the automated remediation;
   for the first portion and any tickets of the second portion for which the corresponding customer encountered issued are not resolved by the automated remediation, attempting to resolve corresponding customer encountered issues using human-assisted remediation driven by a remediation recommendation system; and
   documenting resolutions of the customer encountered issues based on:
      changes in pain levels of corresponding customers during each attempted remediation, and
      timeliness of respective resolutions.

14. The non-transitory machine-readable medium of claim 13, wherein attempting to resolve the corresponding customer encountered issues using the human-assisted remediation driven by the remediation recommendation system comprises:

for a first attempt of the attempts to resolve one of the corresponding customer encountered issues using the human-assisted remediation:
identifying mitigation actions for the first attempt based on a type of one of the corresponding customer encountered issue;
performing the mitigation actions;
identifying a pain level of a customer following the performance of the mitigation actions; and
identifying one of the changes in the pain levels based on the identified pain level.

15. The non-transitory machine-readable medium of claim 13, wherein the operations further comprise:
obtaining the changes in pain levels of the corresponding customers during each attempted remediation using a pain level scoring system.

16. The non-transitory machine-readable medium of claim 15, wherein the pain level scoring system assigns numerical values to detected emotions in the customers and the numerical values depending on a type of the emotions.

17. A data processing system, comprising:
a processor; and
a memory coupled to the processor to store instructions, which when executed by the processor, cause the processor to perform operations for managing remediation of customer encountered issues, the operations comprising:
obtaining tickets regarding the customer encountered issues;
classifying the tickets into:
a first portion that likely require human-assisted remediation for resolution of corresponding customer encountered issues, and
a second portion for which corresponding customer encountered issues are likely to be resolved using automated remediation;
for the second portion, attempting to resolve the corresponding customer encountered issues using the automated remediation;
for the first portion and any tickets of the second portion for which the corresponding customer encountered issued are not resolved by the automated remediation, attempting to resolve corresponding customer encountered issues using human-assisted remediation driven by a remediation recommendation system; and
documenting resolutions of the customer encountered issues based on:
changes in pain levels of corresponding customers during each attempted remediation, and
timeliness of respective resolutions.

18. The data processing system of claim 17, wherein attempting to resolve the corresponding customer encountered issues using the human-assisted remediation driven by the remediation recommendation system comprises:
for a first attempt of the attempts to resolve one of the corresponding customer encountered issues using the human-assisted remediation:
identifying mitigation actions for the first attempt based on a type of one of the corresponding customer encountered issue;
performing the mitigation actions;
identifying a pain level of a customer following the performance of the mitigation actions; and
identifying one of the changes in the pain levels based on the identified pain level.

19. The data processing system of claim 17, wherein the operations further comprise:
obtaining the changes in pain levels of the corresponding customers during each attempted remediation using a pain level scoring system.

20. The data processing system of claim 19, wherein the pain level scoring system assigns numerical values to detected emotions in the customers and the numerical values depending on a type of the emotions.

* * * * *